United States Patent [19]

Williams

[11] 4,308,183

[45] Dec. 29, 1981

[54] WATER-BASED EPOXY CERAMIC GLAZE

[75] Inventor: Morris B. Williams, New York, N.Y.

[73] Assignee: Hoboken Paints, Inc., Lodi, N.J.

[21] Appl. No.: 158,916

[22] Filed: Jun. 12, 1980

[51] Int. Cl.$^3$ .......................... C09D 3/58; C09D 3/70
[52] U.S. Cl. .......................... 260/18 EP; 260/18 PN;
260/18 N; 260/29.2 EP
[58] Field of Search ........... 260/18 EP, 18 PN, 18 N,
260/29.2 EP

[56] References Cited

U.S. PATENT DOCUMENTS

| | | | |
|---|---|---|---|
| 2,589,245 | 3/1952 | Greenlee | 260/24 |
| 2,705,223 | 3/1955 | Renfrew et al. | 260/18 PN |
| 2,772,248 | 11/1956 | Lieberman et al. | 260/29.2 EP |
| 2,811,495 | 10/1957 | Wittcoff et al. | 260/29.2 EP |
| 2,899,397 | 8/1959 | Aelony et al. | 260/29.2 EP |
| 3,062,773 | 11/1962 | Rogier | 260/18 PN |
| 3,183,198 | 5/1965 | Wagner | 260/18 PN |
| 3,257,342 | 6/1966 | Kwong | 260/18 PN |
| 3,280,054 | 10/1966 | Gotze et al. | 260/18 PN |
| 3,296,179 | 1/1967 | Lister et al. | 260/31.2 R |
| 3,349,049 | 10/1967 | Seiwert et al. | 260/22 D |
| 3,449,278 | 6/1969 | McKay et al. | 260/29.2 EP |
| 3,459,701 | 8/1969 | Chandler et al. | 260/18 PN |
| 3,527,729 | 9/1970 | Bingham et al. | 260/40 TN |
| 3,666,695 | 5/1972 | Jachimowicz et al. | 260/18 PN |
| 3,888,812 | 6/1975 | Plettner | 260/29.2 EP |
| 3,956,208 | 5/1976 | Hoki et al. | 260/18 PN |
| 3,983,056 | 9/1976 | Hosoda et al. | 260/29.2 EP |
| 3,998,771 | 12/1976 | Feneis et al. | 260/18 PN |
| 4,073,762 | 2/1978 | Hosoda et al. | 260/29.3 |
| 4,104,223 | 8/1978 | Hosoda et al. | 260/29.2 EP |
| 4,105,808 | 8/1978 | McKenzie | 260/18 PN |
| 4,134,865 | 1/1979 | Tominaga | 260/18 PN |
| 4,134,866 | 1/1979 | Tominaga | 260/29.2 EP |
| 4,167,498 | 9/1979 | Waddill | 260/29.2 EP |
| 4,169,080 | 9/1979 | Spencer | 260/29.2 EP |
| 4,177,177 | 12/1979 | Vanderhoff et al. | 260/29.2 M |
| 4,179,418 | 12/1979 | Waddill | 260/29.2 EP |

*Primary Examiner*—Ronald W. Griffin
*Attorney, Agent, or Firm*—Auslander, Thomas & Morrison

[57] ABSTRACT

A two-part water-borne epoxy resin coating, the parts being mixed prior to use, part A containing an emulsified bisphenol A type epoxy resin and having a viscosity of 500 to 700 cps and part B containing an aqueous solution of polyamids-amine.

11 Claims, No Drawings

WATER-BASED EPOXY CERAMIC GLAZE

BACKGROUND OF THE INVENTION

This invention relates to coatings. It particularly relates to water-based epoxy coatings having a tile-like gloss finish which is hard, resistant to abrasion, resistant to chemicals and durable.

Water-based epoxy resins for use in coatings are well known. These resins are obtained by the reaction of polymeric epoxides and amines such as polyamines or polyamides. The reaction is disclosed in numerous U.S. Pat. Nos. 2,589,245; 2,705,223; 2,772,248; 2,811,495; 2,872,427; 2,909,448 and 3,062,773.

Considerable work has been done to obtain improved resin and improved processes for preparing such resins. Such work has involved the use of different or modified types of resistants to obtain the resin, variations in the ratio of reactants, or the use of additives. Examples of these modifications are described in U.S. Pat. Nos. 2,899,397; 3,257,342; 3,280,054; 3,449,278; 3,888,812; 3,956,208; 3,998,771; 3,983,056; 4,073,762; 4,104,223; 4,105,808; 4,134,865; 4,134,866; 4,167,498; 4,169,080; 4,177,177 and 4,179,418.

The water-based epoxy resins and any coatings prepared therefrom as well as prior art water-based epoxy resins and coating compositions containing such resins, generally known to the applicant, do not provide epoxy coatings having a tile-like gloss finish which is hard, durable and resistant to abrasion and chemicals.

SUMMARY OF THE INVENTION

The invention comprises a two-part water-borne system, which parts are kept separated, but mixed prior to use. The first part, hereinafter referred to as Part A, comprises an aqueous emulsion of a polymeric ethylene oxide (epoxide), and the second part, hereinafter referred to as Part B, comprises an aqueous solution of a blend of amido-amines. After mixing substantially equal volumes of the two parts, the resulting water-borne composition is applied as desired. The curing of the epoxide by the amido-amines serves to produce the tile-like high gloss finish.

DESCRIPTION OF EMBODIMENTS

Part A of the two-part compositions of the present invention comprises a low-viscosity epoxy resin, one or more emulsifying agents, one or more defoamers and a co-solvent.

The preferred epoxy resin is a modified bisphenol A type epoxy resin having a viscosity of about 500 to 700 cps. This resin is available from Ciba-Geigy Co., Ardsley, N.Y., under the trade name "Araldite GY 9513" and from Dow Chemical Co., Midland, Michigan, under the trade name "DER-324."

The aqueous emulsion of the epoxy resin contains one or more emulsifying agents to stabilize the emulsion. Preferably, more than one emulsifying agent is used. Suitable emulsifying agents include nonylphenoxypoly [(n=40 to 100) ethyleneoxy] ethanols and long chain organic phosphatides. Preferably, the nonylphenoxypoly-[(n=40 to 100) ethyleneoxy] ethanols comprise a mixture of about 4 parts by weight of nonylphenoxypoly (n=40 ethyleneoxy) ethanol and 3 parts by weight of nonylphenoxypoly (n=44 etheneoxy)-ethanol. A suitable chain organic phosphatide is soya lecithin.

While most defoaming agents are suitable, a silicone defoamer, preferably one containing hydrophobic silica is used.

Solvents which dissolve resins are soluble in water, such as lower alkyl ethers of ethylene glycol, are used as co-solvents, Butyl cellosolve is preferred.

If desired, pigments may be added to Part A. Suitable pigments are inert with respect to the components of the emulsion. Examples of such pigments include titanium dioxide, ferric oxide, chromium oxide and the like.

The Part A emulsions, the two-part compositions of the present invention comprise in percent by weight.

| | |
|---|---|
| Bisphenol A type epoxy having a viscosity of about 500 to 700 cps | 30.0 to 45.0 |
| A mixture containing 4 parts by weight of nonylphenoxy (n = 40 ethyleneoxyl) ethanol and 3 parts by weight of nonylphenoxy (n = 44 ethyleneoxy 44) ethanol | 1.0 to 2.5 |
| Long chain organic phosphatide | 0.1 to 0.5 |
| Co-solvent | 3.5 to 6.0 |
| Pigment | 0 to 40 |
| Water | Q.S. to 100 |

Preferably, the Part A emulsions comprise in percent by weight:

| | |
|---|---|
| Bisphenol A type epoxy resin having a viscosity of about 500 to 700 cps | 38.0 to 40.0 |
| A mixture containing about 4 parts by weight of nonylphenoxypoly (n = 40 ethyleneoxyl) ethanol and about 3 parts by weight of nonylphenoxypoly (n = 44 ethyleneoxyl) ethanol | 1.3 to 2.0 |
| Soya lecithin | 0.2 to 0.3 |
| Silicone defoamer | 0.4 to 0.8 |
| Butyl Cellosolve | 4.0 to 5.2 |
| Pigment | 0 to 30 |
| Water | Q.S. 100 |

The preparation of a suitable Part A emulsion is described in Example I below:

EXAMPLE I

A 100 gallon tank, equipped with a stirrer, is charged with 292 pounds (35 gallons) warm water (85° to 100° F., 4 pounds (0.5 gallon) of a hydrophobic silica defoamer, 8 pounds (0.875 of nonylphenoxypoly (n=40) ethyleneoxyethanol, 6 pounds (0.625 gallon) of nonylphenoxypoly (n=44) ethyleneoxyethanol, 3 pounds (0.375 gallon) soya lecithin and 21 pounds (2.875 gallons) butyl cellosolve. The mixture is stirred until uniform. Additional butyl cellosolve (21 pounds, 2.875 gallons) are added with stirring and then 419 pounds (46 gallons) Araldite GY 9513, and 11 pounds (1.5 gallons) butyl cellosolve are added with stirring. Pigments were then added and stirring continued until the mixture was uniform.

Part B of the two-part compositions of the present invention comprises an aqueous solution of amido amines containing a blend of amido-amines. Preferably, the blend contains from about 59.0 to 85.0% by weight of a water-soluble modified polyamids amines having a molecular weight of about 2,000 to 18,000, derived from fatty acids of linseed oil, said acid having a chain length of about 18 carbon atoms, and aliphatic diamines, and from about 150 to 41.0% by weight of a water-soluble polyamide amine, having a molecular weight of about 2,000 to 15,000, derived from a dimeric vegetable fatty acid having a chain length of about 36 carbon atoms, and ethylene diamine.

The polyamido-amines been derived from the $C_{18}$ carboxylic acid are obtainable from Ciba-Geigy Co., Ardsley, N.Y. under the trade name "XU 207 Hardener." The polyamido-amines derived from the $C_{36}$ carboxylic acid are obtainable from Henkel Co., Hoboken, N.J., under the trade name "GENAMID 5701-H65."

The Part B solution of the two-part compositions of the present invention comprise in percent by weight:

| | |
|---|---|
| Blend of polyamido-amines, said blend containing about 59.0 to 85.0% by weight of water-soluble modified polyamido-amines having a molecular weight of about 2,000 to 18,000 and derived from fatty acids having a chain length of about 18 carbon atoms and aliphatic diamines, and about 15.0 to 41.0% by weight of water-soluble polyamido-amines having a molecular weight of about 2,000 to 15,000 and derived from dimeric fatty acids having a chain length of about 36 carbon atoms and ethylene diamine | 75.0 to 85.0 |
| Co-solvents | 1.0 to 8.0 |
| Water | Q.S 100 |

Preferably, the solution contains about 80.0 to 82.0 percent by weight of the blend of polyamido-amines and about 3.0 to 5.0 percent by weight of co-solvent. Butyl cellosolve is the preferred co-solvent.

The preparation of a suitable Part B solution is described in Example II below:

EXAMPLE II

In a 100-gallon tank are introduced 424 pounds (50 gallons) of XU 2 7 Hardener and 258 pounds (30 gallons) of Genamid 5701-H65. Warm (temperatures 85° to 100° F.) water (140 pounds, 16.75 gallons) is added with stirring. When solution is complete, 26 pounds (3.5 gallons) of butyl cellosolve are added and the stirring continued until a uniform solution is obtained.

If desired, water soluble dyes, such as ultramarine blue, may be added to this solution.

It is to be understood that the procedures and amounts of components shown in Examples I and II above are only for purposes of illustration and are not to be considered as limiting.

The two-part ceramic glaze, water-borne system is used by blending substantially equal volumes of Parts A and B prior to use. The blended mixture should be allowed to stand for about 25 minutes to provide a suitable induction period for the curing to begin. The blended mixture is then restirred and is ready for use.

At about 25° C., the pot life is about 4 hours. The composition should not be refrigerated to extend the pot life. If the blended mixture is not used within 2.5 hours, a small amount of water should be added to improve the working properties. If a pigment or other color has been added, it is best to use the blended mixture within 2.5 hours to obtain good color uniformity. Preferably, enough of Parts A and B should be blended to provide enough for a maximum painting time of about 4 hours. Additional directions for using the blended mixture are provided below.

Thinning

Paint working properties are sufficient to brush Part A and Part B are blended. However, if thinning is necessary, add a little water, maximum 1 pint water to a gallon of blended mixture. Blended mixture may be rolled or sprayed. If spraying is desired, see special instructions for spraying.

Application

Blend of Part A and Part B can be brushed, rolled or sprayed. For general purpose paint, 1 coat (2 mils) dry is sufficient. For water immersion or maximum chemical resistance, 2 or more coats (6–10 mils) dry will be necessary. For spraying, use airless spray gun. Pressure must be high enough to spray maximum reduction of 3 parts blended mixture to 1 part water by volume. Do not exceed this reduction for spraying minimum air pressure—50 psi. Do not apply below 55° F., and relative humidity above 80% (low temperature and high humidity adversely affects rate of cure).

Spreading Rate

Apply each coat at a rate of 260–320 square feed per gallon.

Drying Time

Dries to touch in $6\frac{1}{2}$ hours. Allow overnight dry before recoating. Light walk on traffic after 24 hours. Full cure in 7 days.

Clean-Up

Clean brushes, rollers, tools and other equipment coming into contact with the paint with warm water and detergent.

Surface Preparation

Old surfaces must be cleaned free of oil, grease, rust, excess mortar and other contaminants. Metal surfaces should be wire brushed, wooden surfaces should be scraped and sanded, new concrete floors should be allowed to cure for 3 to 4 weeks. If top surface is brittle, all loose dust should be removed by grinding or sanding. Surface is then etched by mixing 1 part concentrated muriatic acid with 4 parts water. Spread solution onto the concrete floor and allow to work 10 to 15 minutes. Rinse with water thoroughly and allow to dry 2 days. On previously painted surfaces, be sure loose adhering paint is scraped off and sanded. On new surfaces, prime first before painting (see priming section). Ceramic surfaces must be wet sanded with emery cloth and sand solution of thick bicarbonate water slurry. Sanding should be continued until surface is dull.

Priming

On wooden surfaces, use Hoboken Alkyd Primer. Allow to dry overnight. On new construction, concrete and masonry surfaces, use Hoboken High Solids Latex Block Filler. Allow to dry overnight. On metal surfaces, use Hoboken Rust Inhibitor Oil Primer. Allow overnight to dry. For ceramic surfaces, after surface prep, apply 1 heavy coat, allow to dry overnight, sand surface well, then apply heavy second coat. For maximum chemical resistance and water immersion, at least 2 heavy coats is necessary. Sanding between coats and allowing 7 days cure time after the 2nd coat is applied.

The coating of the present invention gives a tile-like gloss finish which is hard, abrasion resistant, durable and highly chemical resistant with excellent leveling and flow. This coating forms a film when completely cured, is resistant to oil, grease, gasoline, alkali, water and splashes from solvents and weak acids on temporary exposure.

It withstands radioactivity and consequently, it is easy to decontaminate. This property makes the coating particularly suitable for use in nuclear power plants.

Areas of use include washrooms, cellars, basements, garage floors, balconies, machinery, metal objects, wash tubs, wooden panels, masonry and concrete surfaces, fiberglass, and approved for food storage areas.

Table I, below, provides a comparison of the two-part water-borne epoxy coating of the present invention with commercially available two-part acrylic epoxy coating.

TABLE I

| Property | Coating of the Present Invention | Commercially Available Coatings |
|---|---|---|
| Viscosity (A & B) | 95 KU | 95 KU |
| Pot Life 25° C. | 4 hours | 8 hours |
| Dry time | 24 hours hard | 36 hours tacky |
| Max. Cure | 7 days | 14 days |
| Ease of Brushing | Very good | Very good |
| Leveling | Excellent | Excellent |
| Gloss 60° | 95 | 89 |
| Gloss Retention | Very good | Fair |
| Opacity | One coat | One coat |
| Color | Gray white | Pure white |
| Color Acceptance (All Phase) | Part A - very good Part B - excellent | Part A - excellent Part B - flocculates |
| Flash Rusting (Bare Steel) | None Overnight - none | None Overnight - none |
| Mar Resistance | Excellent | Fair |
| Film Flexibility (Steel) | Excellent | Brittle |
| Walk on Traffic | 24 hours | 48 hours |
| Odor | Very low | Pungent |
| Glycol Ether Content | Very low | Very high |
| Chemical Resistance | Excellent | Poor |

The coating of the present invention has a film drying time and provides a tighter film than obtained with the commercially available preparations.

It is understood the following claims are intended to cover all of the generic and specific features of the invention herein described, and all statements of the scope of the invention which, as a matter of language, might fall therebetween.

Having described certain forms of the invention in some detail, what is claimed is:

1. A two-part water-borne epoxy coating composition comprising a resin base portion and a hardener portion; said resin base portion comprising in percent by weight:

| | |
|---|---|
| a bisphenol A epoxy resin having a viscosity of about 500 to 700 cps, | 30 to 45 |
| a mixture consisting of about 4 parts by weight of nonylphenoxypoly (n = 40 ethyleneoxy) - ethanol and 3 parts by weight of nonylphenoxypoly (n = 44 ethyleneoxy) - ethanol, | 1.0 to 2.5 |
| a long chain organic phosphatide, | 0.1 to 0.5 |
| defoaming agents, | 0.3 to 0.1 |
| co-solvents, | 3.5 to 6.0 |
| pigments, | 0 to 40 |
| water | Q.S. 100 | and said hardener portion comprising in percent by weight:

| | |
|---|---|
| a blend of polyamido-amines, said blend containing about 59.0 to 85.0 percent by weight of water-soluble modified polyamido-amines having a molecular weight of about 2,000 to 18,000 and derived from fatty acids having a chain length of about 18 carbon atoms and aliphatic diamines and about 15.0 to 41.0 percent by weight of water-soluble polyamido-amines having a molecular weight of about 2,000 to 15,000 and derived from dimeric fatty acids having a chain length of about 36 carbon atoms and ethylene diamine, | 75 to 85 |
| co-solvents | 1.0 to 8.0 |
| water | Q.S. 100 |

2. A two-part water-borne epoxy coating system according to claim 1 wherein the resin base portion of said system comprises in percent by weight:

| | |
|---|---|
| a bisphenol A type epoxy resing having a viscosity of about 500 to 700 cps, | 38 to 40 |
| a mixture containing about 4 parts by weight of nonylphenoxypoly (n = 40 ethyleneoxy) ethanol and 3 parts by weight of nonylphenoxypoly (n = 44 ethyleneoxy) ethanol, | 1.3 to 2.0 |
| long chain organic phosphatide, | 0.2 to 0.3 |
| defoaming agents, | 0.4 to 0.8 |
| co-solvents, | 4.0 to 5.2 |
| pigment, | 0 to 30 |
| water | Q.S 100 |

3. A two-part water-borne epoxy coating system according to claim 2 wherein the hardener portion of said system comprises in percent by weight:

| | |
|---|---|
| the blend of polyamido-amines | 80 to 82 |
| co-solvents | 3.0 to 5.0 |
| water | Q.S 100 |

4. A two-part water-borne epoxy coating system according to claim 3 wherein the co-solvent in both the resin base portion and the hardener portion is butylcellosolve.

5. A two-part water-borne epoxy coating system according to claim 4 wherein the defoamer is a silicone defoamer.

6. A two-part water-borne epoxy coating system according to claim 5 wherein the silicone defoamer contains a hydrophobic silica.

7. A two-part water-borne epoxy coating system according to claim 6 wherein the long chain organic phosphatide is soya lecithin.

8. A two-part water-borne epoxy coating system according to claim 7 wherein the fatty acids having a chain length of about 18 carbon atoms are derived from linseed oil.

9. A two-part water-borne epoxy coating system according to claim 8 wherein the dimeric fatty acids are of vegetable origin.

10. A water-borne epoxy coating system obtained by mixing prior to use substantially equal volumes of said resin base portion and said hardener portion of a composition according to claim 1.

11. A water-borne epoxy coated system obtained by mixing prior to use substantially equal volumes of said resin base portion and said hardener portion of a composition according to claim 9.

* * * * *